(12) United States Patent
Nishiyama

(10) Patent No.: US 7,019,731 B2
(45) Date of Patent: Mar. 28, 2006

(54) METHOD OF USING TEN-KEY KEYPAD

(75) Inventor: Sumio Nishiyama, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 374 days.

(21) Appl. No.: 10/212,794

(22) Filed: Aug. 7, 2002

(65) Prior Publication Data
US 2003/0038787 A1    Feb. 27, 2003

(30) Foreign Application Priority Data
Aug. 24, 2001 (JP) .............................. 2001-255087

(51) Int. Cl.
*G09G 5/00* (2006.01)

(52) U.S. Cl. ...................................... 345/156; 345/172

(58) Field of Classification Search ........ 345/156–157, 345/174–178, 160, 162, 168–173, 810, 815, 345/818, 819; 364/146, 188, 114; 348/14; 341/20–23, 28; 455/90, 557, 566, 575; 715/810, 715/814, 817
See application file for complete search history.

(56) References Cited

U.S. PATENT DOCUMENTS

| | | | | |
|---|---|---|---|---|
| 5,546,166 A | * | 8/1996 | Hirota et al. | 399/43 |
| 5,546,310 A | * | 8/1996 | Ehdaie et al. | 701/207 |
| 5,598,523 A | * | 1/1997 | Fujita | 345/840 |
| 5,915,228 A | * | 6/1999 | Kunihiro et al. | 455/575.1 |
| 5,936,611 A | * | 8/1999 | Yoshida | 345/158 |
| 5,990,930 A | * | 11/1999 | Shibata | 348/14.03 |
| 6,731,227 B1 | * | 5/2004 | Horie | 341/22 |
| 6,879,846 B1 | * | 4/2005 | Miyata | 455/566 |
| 2002/0009193 A1 | * | 1/2002 | Deguchi | 379/433.01 |
| 2003/0040341 A1 | * | 2/2003 | Casais | 455/566 |
| 2003/0101178 A1 | * | 5/2003 | Miyata et al. | 707/6 |
| 2004/0051695 A1 | * | 3/2004 | Yamamoto et al. | 345/156 |

FOREIGN PATENT DOCUMENTS

| | | | |
|---|---|---|---|
| JP | 02047708 | * | 2/1990 |
| JP | 07015767 | * | 1/1995 |

* cited by examiner

*Primary Examiner*—Vijay Shankar
*Assistant Examiner*—Nitin Patel
(74) *Attorney, Agent, or Firm*—Arent Fox PLLC

(57) ABSTRACT

A ten-key keypad for inputting numerals mounted on a portable telephone T is adapted to a zoom function and a scroll function for operating an image displayed on a display. The user can use the keys of the ten-key keypad to select the mode in which case the keys also serve as image operation keys.

14 Claims, 4 Drawing Sheets

METHOD OF USING TEN-KEY KEYPAD

BACKGROUND OF THE INVENTION

1. Field of the Invention

This invention relates to a method of using a ten-key keypad mounted on a portable telephone, a remote controller of a car navigation system, or the like.

The present application claims priority from Japanese Application No. 2001-255087, the disclosure of which is incorporated herein by reference for all purposes.

2. Description of the Related Art

Some of portable telephones becoming increasingly commonplace in recent years have a service function for connecting with the Internet and are capable of displaying a Web page or a map image for a navigation system on their display.

When such a portable telephone is designed to include, on an operation panel, an arrangement of image-operation keys for changing display on a screen, such as a scroll key for horizontally or vertically scrolling a Web page or map image data on the display, a setting key for setting the scale of a map image, and the like, this design has problems of the increasing difficulty of the arrangement of the image operation keys in conjunction with progressive reduction in size of the portable telephone, and of greater complication in the operability of the image operation keys thus arranged.

The remote controller of a car navigation system is typically provided with a scroll key for scrolling a map image as well as a variety of operation keys for changing a screen. As the remote controller has gradually decreased in size and the number of available functions has increased in recent years, a problem has arisen of the increasing difficulty of the arrangement of the operation keys and the like on the remote controller and of the greater complication in operability as in the case of the portable telephone.

Likewise, other types of such compact electronic apparatus needing keys for operating a screen have similar problems.

SUMMARY OF THE INVENTION

The present invention has been made to solve the problems associated with compact electronic apparatuses needing keys for operating a screen as described above.

Accordingly, it is an object of the present invention to provide an effective approach toward a reduction in size of an electronic apparatus needing keys for operating a screen, with improved operability.

To attain the above object, a method of using a ten-key keypad has a first feature of comprising the step of adapting the ten-key keypad, mounted on an electronic apparatus for inputting numerals, to an image-operation function for operating an image displayed on a display of the electronic apparatus, to allow the keys of the ten-key keypad to serve as image-operation keys by means of mode selection.

With the method of using the ten-key keypad in the first feature, in an electronic apparatus such as a portable telephone capable of displaying a Web page or a map image for a navigation system on its display, or a remote controller of a car navigation system provided with the ten-key keypad for retrieving a telephone number, the keys of the ten-key keypad are adapted to functions for variously operating an image displayed on the display, e.g. a zooming operation, a scrolling operation. Due to this adaptation, upon mode selection, the ten-key keypad normally used for inputting numbers is allowed to serve also as an image-operation keypad.

Accordingly, this method obviates the necessity for an electronic apparatus involving an image operation to be provided with keys for operating the image, such as a scroll key, in addition to the ten keys for inputting numbers. Hence, it is possible to avoid the problem that the inclusion of a large number of operation keys on a compact electronic apparatus (e.g., especially a portable telephone, a remote controller or the like) will impair the operability of the compact electronic apparatus. Further, the elimination of the need for including a large number of operation keys permits a greater reduction in the size of the electronic apparatus.

To attain the aforementioned object, a method of using a ten-key keypad has a second feature, in addition to the configuration of the first feature, that the image-operation function is a zoom function for zooming out and zooming in the image displayed on the display.

With the method of using the ten-key keypad in the second feature, the user operates the ten-key keypad to selects the mode of the ten-key keypad to zoom out or in an image displayed on the display mounted on a portable telephone or the display of a navigation system for example.

To attain the aforementioned object, a method of using a ten-key keypad has a third feature, in addition to the configuration of the first feature, that the image-operation function is a scroll function for moving the image displayed on the display.

With the method of using the ten-key keypad in the third feature, the user operates the ten-key keypad to select the mode of the ten-key keypad to scroll an image, displayed on the display mounted on a portable telephone or the display of a navigation system for example, in a desired direction.

To attain the aforementioned object, a method of using a ten-key keypad has a fourth feature, in addition to the configuration of the first feature, that the electronic apparatus is a portable telephone including a display.

With the method of using the ten-key keypad in the fourth feature, in a portable telephone capable of displaying a Web page or a map image for a navigation system on its display, the keys of the ten-key keypad for inputting a telephone number are adapted to functions for variously operating an image displayed on the display, e.g. a zooming operation, a scrolling operation. Due to this adaptation, upon mode select, the ten-key keypad normally used for inputting numbers is allowed to serve also as an image-operation keypad.

Accordingly, since the portable telephone does not need extra keys provided for operating an image display on the display, there is no possibility of the operating of the image causing impairment in the operability of the portable telephone itself. Further, it is possible to further reduce the size of the portable telephone.

To attain the aforementioned object, a method of using a ten-key keypad has a fifth feature, in addition to the configuration of the first feature, that the electronic apparatus is a remote controller of a navigation system including the ten-key keypad.

With the method of using the ten-key keypad in the fifth feature, in the remote controller of a navigation system provided with the ten-key keypad for retrieving a telephone number or the like, the keys of the ten-key keypad for inputting a number are adapted to functions for variously operating an image, displayed on a display operated through the remote controller, e.g. a zooming operation, a scrolling operation. This adaptation allows the ten-key keypad normally used for inputting numbers to serve also as an image-operation keypad upon mode selection.

Accordingly, by the reason that the remote controller of the navigation system does not need to be provided with extra keys in addition to the ten-key keypad for operating an image displayed on the display, the remote controller is allowed to be designed with a reduced number of operation keys mounted thereon to improve the operability thereof, and also to further reduce the size thereof.

To attain the aforementioned object, a method of using a ten-key keypad has a sixth feature, in addition to the configuration of the first feature, of further comprising the step of adapting any one of the keys of the ten-key keypad to a switching function for selecting image-operation mode for the image-operation function.

With the method of using the ten-key keypad in the sixth feature, the switching function of selecting the image-operation mode is assigned to any one of the keys of the ten-key keypad. By pressing the relevant key, the image-operation mode assigned to the ten-key keypad is selected. This method makes it possible to adapt the ten-key keypad to a plurality of types of image-operation mode, such as a zoom operation, a scroll operation, for example.

To attain the aforementioned object, a method of using a ten-key keypad has a seventh feature, in addition to the configuration of the sixth feature, that the key adapted to the switching function for selecting the image-operation mode, is a numeral input key situated in the center of an arrangement of the numeral input keys "1" to "9" in three columns and three rows.

In the method of using the ten-key keypad of the seventh feature, the switching function for selecting the image-operation mode is assigned to the numeric key situated in the center of the arrangement of the numeric keys "1" to "9" of the ten-key keypad in three columns and three rows, for example, the numeric key "5".

To attain the aforementioned object, a method of using a ten-key keypad has an eighth feature, in addition to the configuration of the sixth feature, that the image-operation mode selected by the switching function assigned to the any one of the keys of the ten-key keypad is zoom mode for zooming out and zooming in the image displayed on the display, and scroll mode for moving the image displayed on the display.

With the method of using the ten-key keypad in the eighth feature, any one of the keys of the ten-key keypad is adapted to the switching function for selecting the image-operation mode, and the relevant key is actuated for selection of the zoom mode or the scroll mode assigned to the ten-key keypad, thereby allowing the user to operate the image in the selected mode.

To attain the aforementioned object, a method of using a ten-key keypad has a ninth feature, in addition to the configuration of the eighth invention, of further comprising the step of assigning the individual keys of the ten-key keypad when in the zoom mode of the image-operation modes, except for the key adapted to the switching function, to degrees of reduction and enlargement scales with respect to the displayed image.

With the method of using the ten-key keypad in the ninth feature, when the image-operation mode of the ten-key keypad is switched to the zoom mode, upon actuation of any one of the keys other than the key for switching to the image-operation mode, the image displayed on the display at the time is zoomed out or in to the degree of reduction or enlargement of the scale assigned to the key actuated and is re-displayed.

To attain the aforementioned object, a method of using a ten-key keypad has a tenth feature, in addition to the configuration of the eighth invention, of further comprising the step of assigning the individual keys of the ten-key keypad when in the zoom mode of the image-operation modes, except for the key adapted to the switching function, to reduction and enlargement scales for an image to be displayed.

With the method of using the ten-key keypad in the tenth feature, when the image-operation mode of the ten-key keypad is switched to the zoom mode, upon actuation of any one of the keys other than the key for selecting the image-operation mode, an image is displayed on a reduction scale or an enlargement scale assigned to the key actuated.

To attain the aforementioned object, a method of using a ten-key keypad has an eleventh feature, in addition to the configuration of the seventh invention, that the image-operation mode selected by the switching function assigned to the numeral input key positioned in the center includes scroll mode for moving the image displayed on the display, and that the method further comprises the step of adapting the numeral input keys, when in the above scroll mode, arranged around the center-positioned numeral input key adapted to the switching function, to a scrolling-direction setting function for moving the image in a direction of scrolling a part of the image, situated in a position corresponding to a numeral input key on the opposite side of the centrally-positioned numeral input key from the numeral key actuated, into view on the display.

With the method of using the ten-key keypad of the eleventh feature, when the key positioned at the center of the ten-key keypad is actuated to switch the image-operation mode assigned to the ten-key keypad to the scroll mode, upon actuation of any one of the keys arranged around the key for selecting the image-operation mode, the image is scrolled on the display screen in such a direction that a hidden part of the image, situated in a position corresponding to a key symmetrically opposite to the key actuated, appears on the display screen.

To attain the aforementioned object, a method of using a ten-key keypad has a twelfth feature, in addition to the configuration of the seventh invention, that the image-operation mode selected by the switching function assigned to the numeral input key positioned at the center is scroll mode for moving the image displayed on the display, and that the method further comprises the step of adapting each of the numeral input keys arranged around the center numeral input key adapted to the switching function, to a scrolling-direction setting function for moving the image in a direction of scrolling a part of the image, situated in a position corresponding to the numeral input key actuated with respect to the center numeral input key, into view on the display.

With the method of using the ten-key keypad of the twelfth feature, when the key positioned at the center of the ten-key keypad is pressed so that the image-operation mode assigned to the ten-key keypad is switched to the scroll mode, upon actuation of any one of the keys arranged around the key for selecting the image-operation mode, the image is scrolled on the display screen in such a direction that a hidden part of the image situated on the side corresponding to the key actuated, appears on the display screen.

To attain the aforementioned object, a method of using a ten-key keypad has a thirteenth feature, in addition to the configuration of the first feature, of comprising the step of adapting any one of the keys of the ten-key keypad to a cancel function of canceling the image operation last performed by the ten-key keypad.

With the method of using the ten-key keypad of the thirteenth feature, upon actuation of the key adapted to the cancel function, the immediately preceding image operation performed by the ten-key keypad is canceled, to change the image displayed on the display back to the image shown before the image operation concerned was performed.

To attain the aforementioned object, a method of using a ten-key keypad has a fourteenth feature, in addition to the configuration of the thirteenth feature, that the key adapted to the cancel function is a numeral input key "0".

With the method of using the ten-key keypad of the fourteenth feature, upon actuation of the numeral input key "0", the immediately preceding image operation performed by the ten-key keypad is canceled, and thus the image displayed on the display is changed back to the last image before the image operation concerned was performed.

These and other objects and features of the present invention will become more apparent from the following detailed description with reference to the accompanying drawings.

DETAILED DESCRIPTION OF THE PREFERRED EMBODIMENT

A preferred embodiment according to the present invention will be described hereinafter in detail with reference to the accompanying drawings.

The present invention described herein is applicable to a variety of compact electronic apparatuses including a ten-key keypad for inputting a number, such as a portable telephone or a remote controller of a car navigation system. The following description takes as an example the case that the present invention is applied to a portable telephone.

Figure 1:
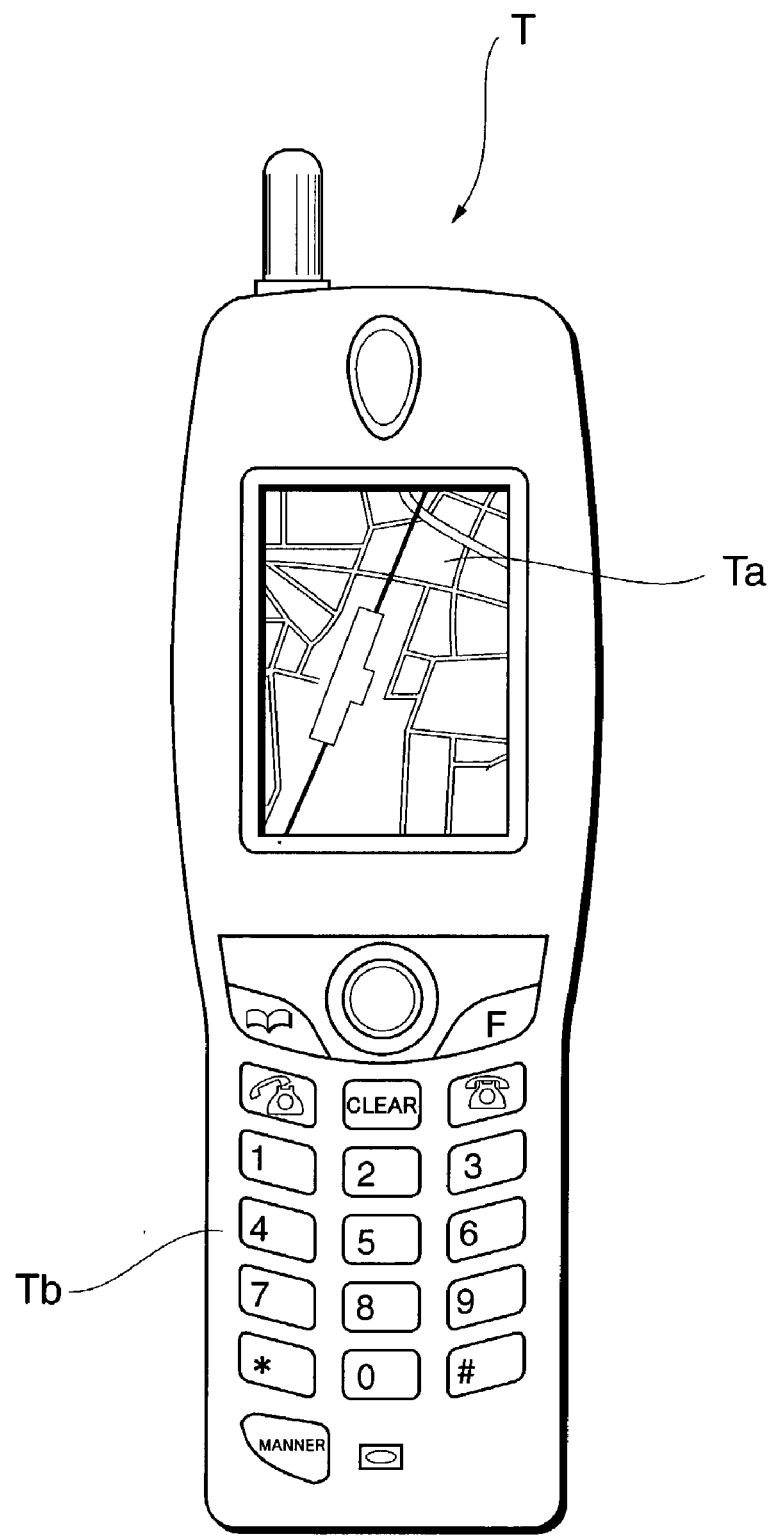
FIG. 1 is an external view illustrating an example of an electronic apparatus embodying the present invention.

FIG. 1 is a front view of a portable telephone having a service function for connecting to the Internet to which the present invention is applied.

Figure 2:
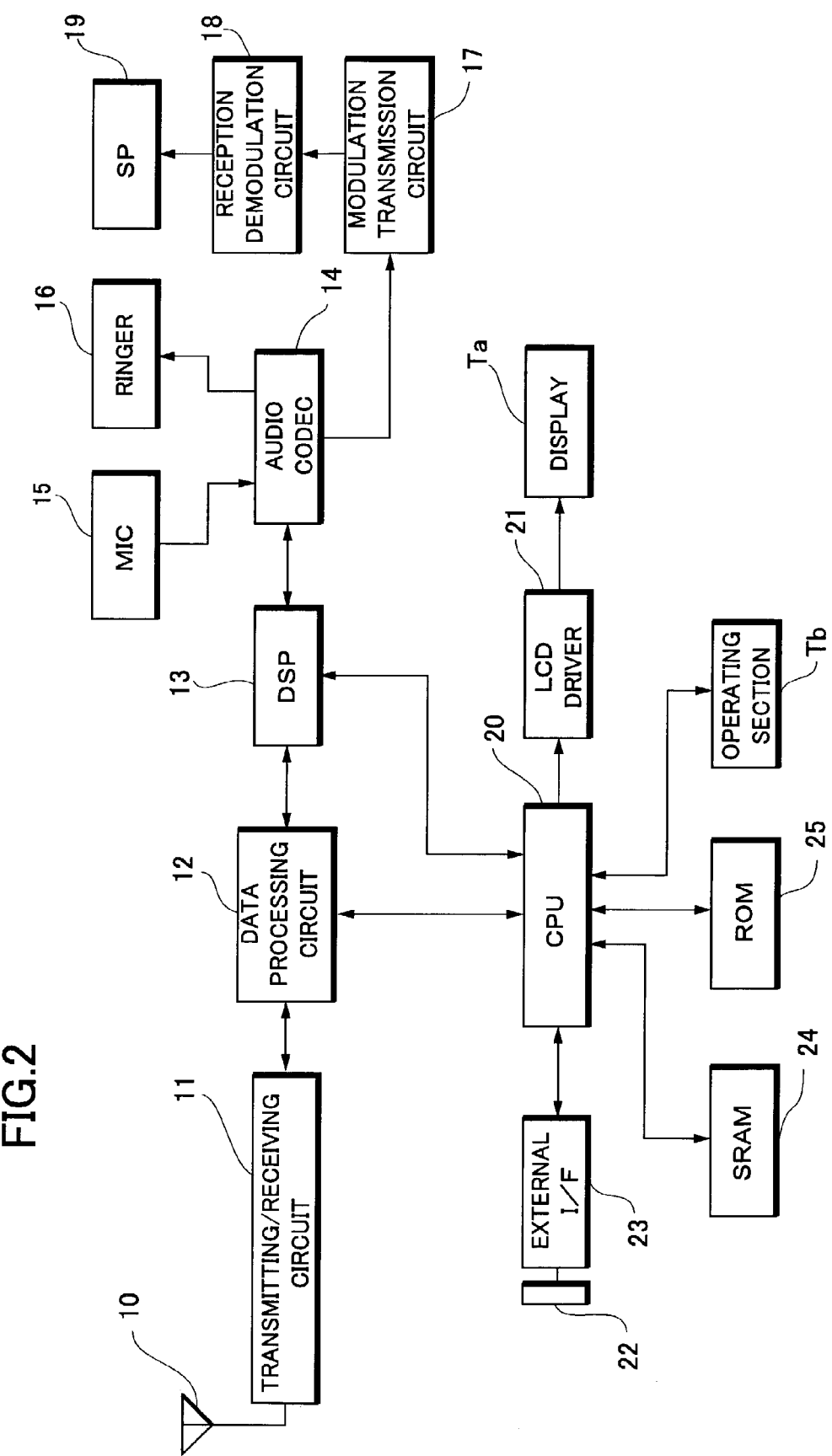
FIG. 2 is a block diagram of an example of the configurations of a portable telephone embodying the present invention.

FIG. 2 is a block diagram illustrating an example of the configurations of a control system of the portable telephone.

In FIG. 2, an antenna 10 mounted on a body casing of the portable telephone T is connected in sequence to: a transmitting/receiving circuit 11; a data processing circuit 12 for performing clock control on an image signal and an audio signal received by the transmitting/receiving circuit 11, the circuit 12 also serving as an interface to a CPU described later; and DSP (Digital Signal Processor) 13 which is a fast processing type microprocessor.

The DSP 13 is connected to an audio codec 14. The audio codec 14 is connected to a microphone 15 and a ringer 16, and also through a modulation transmission circuit 17 and a reception demodulation circuit 18 to a speaker 19.

The data processing circuit 12 and DSP 13 are connected to the CPU 20.

The CPU 20 is connected through an LCD driver 21 to a display Ta (see FIG. 1), and also through an external I/F 23 to a connector 22 which is connected to a personal computer or the like for exchanging various kinds of data with the personal computer or the like. The CPU 20 is further connected to: a SRAM 24 for recording various kinds of personal data, e.g., abbreviated dialing entered by the user; a ROM 25 for recording a variety of control programs for the portable telephone; and an operating section Tb (see FIG. 1) including a variety of operation keys, such as a function key, a ten-key keypad for inputting telephone numbers, and the like.

In the control system of the portable telephone T, a radio wave received via the antenna 10 by the transmitting/receiving circuit 11 is separated into an image signal and an audio signal in the subsequent data processing circuit 12. While the image signal and the audio signal undergo clock control on the basis of instructions from the CPU 20, the image signal is outputted to the CPU 20 and the audio signal is outputted to the DSP 13.

The audio signal inputted to the DSP 13 undergoes audio processing in the DSP 13, is then inputted to the audio codec 14 for D/A conversion, and is then outputted through the modulation transmission circuit 17 and the reception demodulation circuit 18 to the speaker 19, and also to the ringer 16.

On the other hand, an audio signal inputted from the microphone 15 is subjected to A/D conversion in the audio codec 14, and then transmitted through the DSP 13, data processing circuit 12 and the transmitting/receiving circuit 11 from the antenna 10.

The CPU 20 exercises control over operating controls for the data processing circuit 12, DSP 13, LCD driver 21, and so on in accordance with a variety of control programs recorded in the ROM 25.

Specifically, the CPU 20 receives an operation signal from the operation keys on the operating section Tb, then reads out from the ROM 25 a control program corresponding to the operation signal, then outputs image data for a operation screen to the LCD driver 21 on the basis of the read control program to allow it to display the operation screen on the display panel Ta. In addition, the CPU 20 performs the operating controls on the data processing circuit 12 and the DSP 13, the writing of data on the SRAM 24 and reading of the written data, the data exchange with a personal computer or the like connected to the connector 22, and the like.

Next, a description will be given of an example of methods for operating the ten-key keypad arranged on the operating section Tb to scroll or zoom an image displayed on the display Ta of the portable telephone T in FIGS. 1 and 2.

The method of using the ten-key keypad in the example is implemented with the setting as explained below.

A function key "F" mounted on the operating section Tb of the portable telephone T is adapted to a switching function of switching the ten-key keypad between normal numeral-input mode and image-operation mode as described later.

In the ten-key keypad switched to image-operation mode by actuating the function key F, a numeric key "5" located at the center of the ten-key keypad is adapted to a function of switching between scroll mode and zoom mode. In this event, the ten-key keypad is set to be switched in sequence from zoom mode, to scroll mode 1 and to scroll mode 2 with every actuation of the numeric key "5".

The other numeric keys positioned around the numeric key "5" are each adapted to the following functions in each of the modes: zoom mode, scroll mode 1 and scroll mode 2.

For the setting in the zoom mode, each of the numeric keys "4" to "1" is adapted to a zoom-out (wide-area display) function for zooming out an image displayed on the display Ta on a scale which becomes higher as the numerals of the numeric keys becomes lower. Each of the numeric keys "6" to "9" is adapted to a zoom-in (detailed-area display) function for zooming in an image displayed on the display Ta on a scale which becomes higher as the numerals of the numeric keys become higher. When any one of the numeric keys "1" to "4" and "6" to "9" is actuated, the image shown on the display at the time is zoomed out or zoomed in, by stages, on the scale assigned to the actuated numeric key.

For instance, when the numeric key "4" is pressed, an image currently displayed is zoomed out at a predetermined rate one degree above that of the currently displayed image. Likewise, upon pressing the numeric key "3", the image is zoomed out two degrees. Upon pressing the numeric key "2", the image is zoomed out three degrees.

The operation for zooming in an image is performed in a similar manner.

Regarding the scroll modes, scroll mode 1 is for scrolling a hidden part of the image situated opposite the numeric key actuated out of the numeric keys "1" to "4" and "6" to "9" into view on the display Ta. Conversely to scroll mode 1, scroll mode 2 is for scrolling a hidden part of the image situated on the side corresponding to the numeric key actuated out of the numeric keys "1" to "4" and "6" to "9" into view on the display. In each of the scroll modes 1 and 2, each of the numeric keys "1" to "4" and "6" to "9" is adapted to a function of designating a scrolling direction in accordance with the key's position relative to the numeric key "5".

Figure 3:
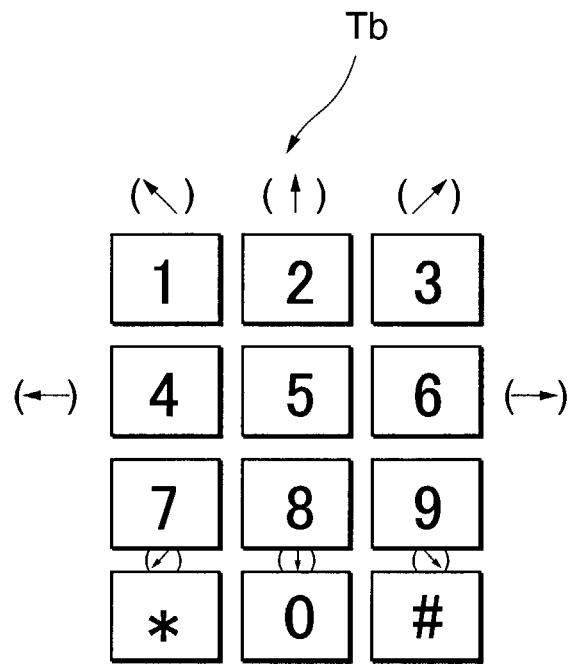
FIG. 3 is an explanatory drawing illustrating an example of scroll functions assigned to a ten-key keypad in accordance with the present invention.

Specifically, the setting for scroll mode 1 is made such that a direction of scrolling the image displayed on the display Ta is designated as a top left direction for the numeric key "1"; a top direction for the numeric key "2"; a top right direction for the numeric key "3"; a left direction for the numeric key "4"; a right direction for the numeric key "6"; a bottom left direction for the numeric key "7"; a bottom direction for the numeric key "8"; and a bottom right direction for the numeric key "9", as indicated by the arrows in FIG. 3.

Figure 4:
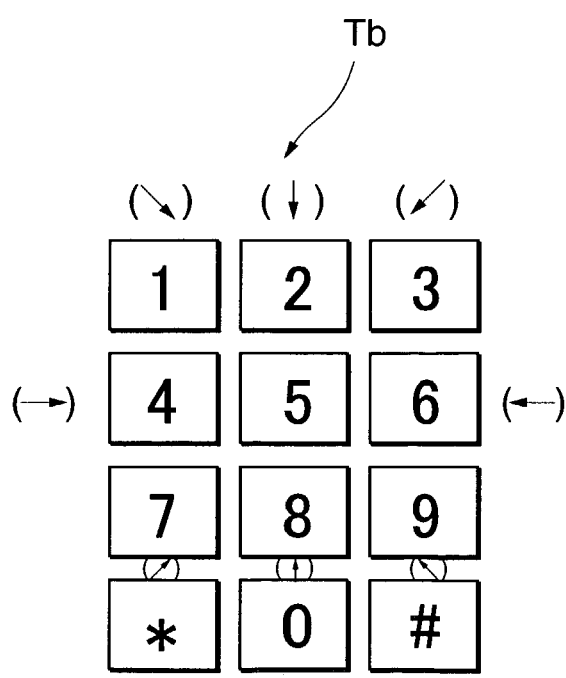
FIG. 4 is an explanatory drawing illustrating another example of scroll functions assigned to a ten-key keypad in accordance with the present invention.

Likewise, the setting in scroll mode 2 is made such that a direction of scrolling an image displayed on the display Ta is designated as a bottom right direction for the numeric key "1"; a bottom direction for the numeric key "2"; a bottom left direction for the numeric key "3"; a right direction for the numeric key "4"; a left direction for the numeric key "6"; a top right direction for the numeric key "7"; a top direction for the numeric key "8"; and a top left direction for the numeric key "9", as indicated by the arrows in FIG. 4.

In the scroll modes 1 and 2, the amount of scrolling when each of the numeric keys is actuated is set at a value proportional to the time period of pressing the numeric key actuated.

A numeric key "0" of the ten-key keypad provided on the operating section Tb is adapted to a cancel function, or a function of resetting an action of the last of the numeric keys "1" to "9" pressed in order to restore the image to the condition before the last numeric key had been pressed.

Each of keys "***" and "#" provided in addition to the above ten numeric keys is adapted to another function of operating the image. In the example, the key "*" is adapted to a rotation function for changing the orientation of the image displayed on the display Ta, and the key "#**" is adapted to an angle function for displaying the image in three dimensions.

In the above portable telephone T, the numerals for, e.g., a telephone number are inputted through the ten-key keypad on the operating section Tb in a conventional manner.

When operating an image displayed on the display Ta, first, the user activates the switching function assigned to the function key "F" to switch the ten-key keypad to the image-operation mode. Then, the user presses the numeric key "5" to select the desired operation mode from among the zoom mode, scroll mode 1 and scroll mode 2 for operation through the ten-key keypad.

After pressing the numeric key "5" to switch the ten-key keypad to the zoom mode, the user selects and presses a numeric key from among the numeric keys "1" to "4" and "6" to "9" in order to zoom out or zoom in the image displayed on the display Ta to the desired scale as assigned to the selected numeric key.

For example, the numeric key "4" is actuated for showing the image displayed on the display Ta on a scale one degree higher, the numeric key "3" is actuated for showing the image on a scale two degrees higher, the numeric key "2" is actuated for showing the image on a scale three degrees higher, and the numeric key "1" is actuated for showing the image on a scale four degrees higher.

The numeric key "6" is actuated for showing the image displayed on the display Ta on a scale one degree lower, the numeric key "7" is actuated for showing the image on a scale two degrees lower, the numeric key "8" is actuated for showing the image on a scale three degrees lower, and the numeric key "9" is actuated for showing the image on a scale four degrees lower.

After pressing the numeric key "5" to switch the ten-key keypad to the scroll mode 1 or scroll mode 2, the user selects and presses a numeric key from among the numeric keys "1" to "4" and "6" to "9" in order to scroll the image on the display Ta in a desired direction.

In the ten-key keypad when switched to the scroll mode 1 in FIG. 3, a numeric key situated in a desired scrolling direction from the currently displayed image, for example, the numeric key "6" is actuated when it is required to scroll the image in the right-hand direction for changing the display to another image situated on the left-hand side of the currently displayed image, and the numeric key "2" is actuated when it is required to scroll the image in the top direction for changing the display to another image situated on the bottom side of the currently displayed image.

In the ten-key keypad switched to the scroll mode 2 in FIG. 4, conversely to the above, a numeric key situated in a direction opposite a desired scrolling direction from the currently displayed image, for example, the numeric key "4" is actuated when it is required to scroll the image in the right-hand direction for changing the display to another image situated on the left-hand side of the currently displayed image, and the numeric key "8" is actuated when it is required to scroll the image in the top direction for changing the display to another image situated on the bottom side of the currently displayed image.

Figure 5:
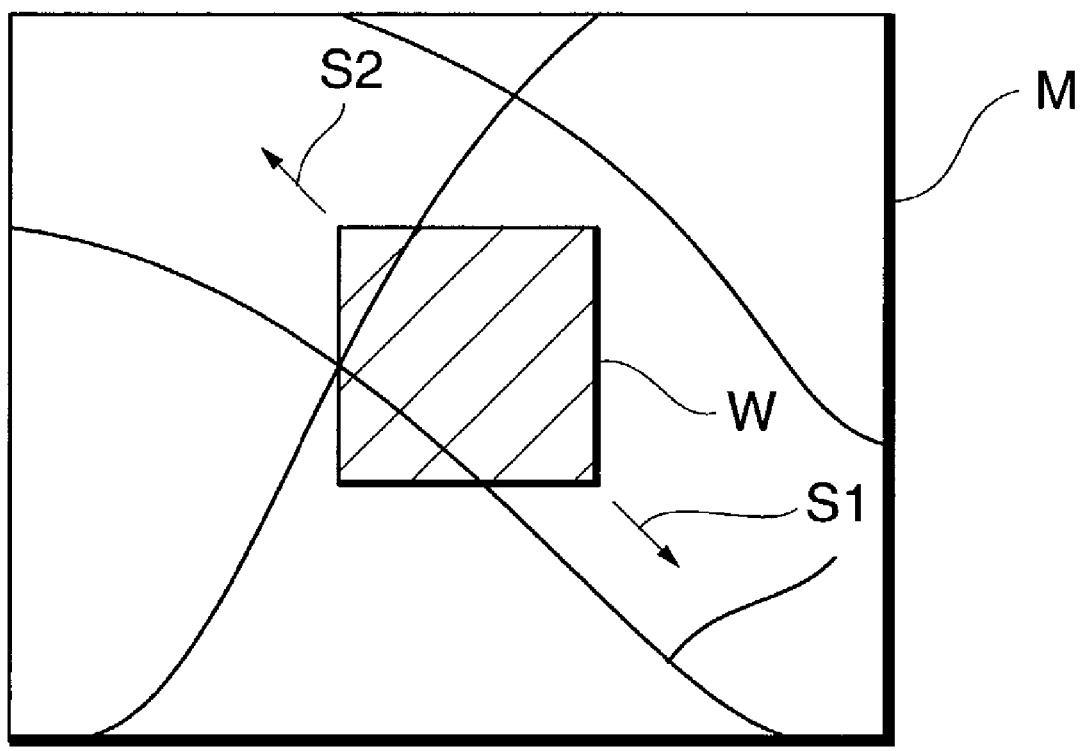
FIG. 5 is an explanatory drawing illustrating a scrolling operation for an image in accordance with the present invention.

In other words, as illustrated in FIG. 5, an image M represents a displayable region of a map generated from map image data and a window W represents a display region of the map M displayed on the display Ta.

In FIG. 5, when the operating section Tb of the portable telephone T is switched to the scroll mode 1 as in FIG. 3, upon actuation of the numeric key "1", for example, the window W relatively moves in the bottom right direction as indicated by the arrow S1 for display of the corresponding part of the map image. When the operating section Tb is switched to the scroll mode 2 as in FIG. 4, upon actuation of the numeric key "1" for example, the window W relatively moves in the top left direction as indicated by the arrow S2 for display of the corresponding part of the map image.

During the operation of an image in the zoom mode, scroll mode 1 or scroll mode 2 as described above, the user can operate the numeric key "0" if requiring to cancel the last input provided by the numeric key and return the image displayed on the display Ta to the state existing before the last key input.

In each of operation modes, when the key "*" is pressed, an image displayed on the display Ta is rotated to a 90 degree angle or a 180 degree angle. When the key "#" is pressed, the image is displayed in three dimensions.

As described above, according to the method of using the ten-key keypad, the keys of a ten-key keypad normally used for inputting numerals such as a telephone number are adapted to an image-operation function for zooming an image and scrolling image data. By selecting the mode, the ten-key keypad is used for performing the desired operation on the image displayed on the display Ta. Thus, this method eliminates a need to mount an extra key for operating a screen, such as a scroll key, on the operating section Tb of the portable telephone T, thereby contributing to reducing the size of the portable telephone T. In addition, it is possible to ensure advantageous operability in a portable telephone T which is increasingly reduced in size, without impairing the operability of other operations performed on images through the operating section Tb.

The foregoing takes an example in which, when any one of the numeric keys "1" to "4" and "6" to "9" is actuated when in the zoom mode, the image displayed at the time is zoomed out or zoomed in by the degree set for each numeric key with reference to a scale ratio in relation to the image displayed at the time. However, the numeric keys "1" to "4" and "6" and "9" may each be allocated scale ratios in relation to the image, so that the image may be displayed on a scale ratio corresponding to the pressed numeric key actuated.

The terms and description used herein are set forth by way of illustration only and are not meant as limitations. Those skilled in the art will recognize that numerous variations are possible within the spirit and scope of the invention as defined in the following claims.

What is claimed is:

1. A method of using a ten-key keypad, comprising the step of adapting the ten-key keypad, mounted on an electronic apparatus for inputting numerals, to an image-operation function for operating an image displayed on a display of the electronic apparatus, to allow the keys of the ten-key keypad to serve as image-operation keys by means of mode selection, and the step of adapting any one of the keys of said ten-key keypad to a switching function for selecting an image-operation mode for said image-operation function.

2. A method of using a ten-key keypad according to claim 1, wherein said image-operation function is a zoom function for zooming out and zooming in the image displayed on the display.

3. A method of using a ten-key keypad according to claim 1, wherein said image-operation function is a scroll function for moving the image displayed on the display.

4. A method of using a ten-key keypad according to claim 1, wherein said electronic apparatus is a portable telephone including a display.

5. A method of using a ten-key keypad according to claim 1, wherein said electronic apparatus is a remote controller of a navigation system including the ten-key keypad.

6. A method of using a ten-key keypad according to claim 1, wherein said key adapted to said switching function for selecting the image-operation mode, is a numeral input key situated in the center of an arrangement of the numeral input keys "1" to "9" in three columns and three rows.

7. A method of using a ten-key keypad according to claim 6, wherein said image-operation mode selected by said switching function assigned to said numeral input key positioned in the center includes scroll mode for moving the image displayed on the display, and that the method further comprises the step of adapting the individual numeral input keys, when in the above scroll mode, ranged around said center-positioned numeral input key adapted to the switching function, to a scrolling-direction setting function for moving the image in a direction of scrolling a part of the image, situated in a position corresponding to a numeral input key on the opposite side of the centrally-positioned numeral input key from the numeral key actuated, into view on the display.

8. A method of using a ten-key keypad according to claim 6, wherein said image-operation mode selected by said switching function assigned to said numeral input key positioned at the center is scroll mode for moving the image displayed on the display, and that the method further comprises the step of adapting each of the numeral input keys ranged around said center numeral input key adapted to the switching function, to a scrolling-direction setting function for moving the image in a direction of scrolling a part of the image, situated in a position corresponding to the numeral input key actuated with respect to the center numeral input key, into view on the display.

9. A method of using a ten-key keypad according to claim 1, wherein said image-operation mode selected by the switching function assigned to the any one of the keys of the ten-key keypad is zoom mode for zooming out and zooming in the image displayed on the display, and scroll mode for moving the image displayed on the display.

10. A method of using a ten-key keypad according to claim 9, further comprising the step of assigning the individual keys of said ten-key keypad when in the zoom mode of the image-operation modes, except for said key adapted to the switching function, to degrees of reduction and enlargement scales wit respect to the displayed image.

11. A method of using a ten-key keypad according to claim 9, further comprising the step of assigning the individual keys of said ten-key keypad when in the zoom mode of the image-operation modes, except for said key adapted to the switching function, to reduction and enlargement scales for an image to be displayed.

12. A method of using a ten-key keypad according to claim 1, further comprising the step of adapting any one of the keys of said ten-key keypad to a cancel function of canceling the image operation last performed by the ten-key keypad.

13. A method of using a ten-key keypad according to claim 12, wherein said key adapted to the cancel function is a numeral input key "0".

14. A method of using a ten-key keypad according to claim 1, wherein said image displayed on the display of the electronic apparatus is a map image.

* * * * *